United States Patent
Sato

(10) Patent No.: US 9,309,972 B2
(45) Date of Patent: Apr. 12, 2016

(54) HOLE PLUG

(71) Applicant: NIFCO INC., Yokohama-shi, Kanagawa (JP)

(72) Inventor: Takehiro Sato, Toyota (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/357,694

(22) PCT Filed: Nov. 9, 2012

(86) PCT No.: PCT/JP2012/079162
§ 371 (c)(1),
(2) Date: May 12, 2014

(87) PCT Pub. No.: WO2013/073481
PCT Pub. Date: May 23, 2013

(65) Prior Publication Data
US 2014/0319160 A1    Oct. 30, 2014

(30) Foreign Application Priority Data

Nov. 16, 2011  (JP) ................................. 2011-250796
Jun. 15, 2012  (JP) ................................. 2012-136046

(51) Int. Cl.
*B62D 25/24*    (2006.01)
*F16J 13/14*    (2006.01)
*B65D 39/00*    (2006.01)

(52) U.S. Cl.
CPC ................. *F16J 13/14* (2013.01); *B62D 25/24* (2013.01); *B65D 39/0005* (2013.01)

(58) Field of Classification Search
CPC .... B65D 39/02; B65D 39/0005; B65D 25/24; F16J 13/14

USPC ......... 220/787, 780, 784, 789, 790, 796, 800, 220/801, 359.1, 359.4, 233
See application file for complete search history.

(56) References Cited

U.S. PATENT DOCUMENTS 2,009,132 A * 7/1935 Gehris ............................ 49/465
4,334,632 A * 6/1982 Watanabe ...................... 220/787
(Continued)

FOREIGN PATENT DOCUMENTS

CN    101068725 A    11/2007
JP    H02-008867 U    1/1990
(Continued)

OTHER PUBLICATIONS

PCT, "International Search Report for PCT/JP2012/079162".
(Continued)

*Primary Examiner* — Anthony Stashick
*Assistant Examiner* — Ernesto Grano
(74) *Attorney, Agent, or Firm* — Manabu Kanesaka

(57) ABSTRACT

In a case wherein a force acts upward from below on a face plate (34) of a hole plug (14) that is closing an attachment hole (12) of a body panel (10), the face plate (34) is pushed up, and an intermediate wall portion (26) moves upward relative to an outer circumferential wall portion (18). At that time, an outside portion (40B) of an abutment portion (40) is folded inward, and an inside portion (40A) of the abutment portion (40) abuts against an inside face of a lower portion of the outer circumferential wall portion (18). As a result, the inside portion (40A) of the abutment portion (40) can control engagement claws (20) from deforming inward.

7 Claims, 10 Drawing Sheets

(56) References Cited

U.S. PATENT DOCUMENTS

| | | | | |
|---|---|---|---|---|
| 4,760,935 | A * | 8/1988 | van den Beld et al. | 220/789 |
| 4,801,040 | A * | 1/1989 | Kraus | 220/787 |
| 4,998,642 | A * | 3/1991 | Kraus | 220/782 |
| 5,267,667 | A * | 12/1993 | Cozzani | 220/787 |
| 5,551,191 | A | 9/1996 | Maiwandi | 49/465 |
| 6,296,136 | B1 * | 10/2001 | Huet | 220/233 |
| 6,319,436 | B1 * | 11/2001 | Jaeger et al. | 264/40.6 |
| 6,588,071 | B2 * | 7/2003 | Gramss | 24/297 |
| 6,708,979 | B2 * | 3/2004 | Stratman et al. | 277/316 |
| 7,108,269 | B2 * | 9/2006 | Benkel et al. | 277/606 |
| RE39,654 | E * | 5/2007 | Huet | 16/2.1 |
| 7,347,655 | B2 * | 3/2008 | Nagasawa et al. | 411/508 |
| 7,537,132 | B2 * | 5/2009 | Marple et al. | 220/254.7 |
| 8,070,008 | B2 * | 12/2011 | Janke | 220/233 |
| D652,782 | S * | 1/2012 | Sato | D12/400 |
| 8,162,166 | B2 * | 4/2012 | Nakazato | 220/359.4 |
| 8,387,822 | B2 * | 3/2013 | Antal et al. | 220/786 |
| 8,672,178 | B2 * | 3/2014 | Siragusa | 220/789 |
| D719,897 | S * | 12/2014 | Sato | D12/400 |
| 8,919,606 | B2 * | 12/2014 | Sato | 220/802 |
| 2001/0049858 | A1 * | 12/2001 | Huet | 16/2.1 |
| 2006/0186130 | A1 * | 8/2006 | Jatzke et al. | 220/789 |
| 2007/0062962 | A1 * | 3/2007 | Iwahara | 220/796 |
| 2009/0274510 | A1 | 11/2009 | Basserie et al. | |
| 2011/0233950 | A1 * | 9/2011 | Takita | 296/1.06 |

FOREIGN PATENT DOCUMENTS

| | | |
|---|---|---|
| JP | 2005-315327 A | 11/2005 |
| JP | 2009-293661 A | 12/2009 |
| JP | 2011-064296 A | 3/2011 |

OTHER PUBLICATIONS

Europe Patent Office, "Search Report for EP 12850659.9," Jun. 19, 2015.

China Patent Office, "Office Action for CN 201280055920.2," Aug. 18, 2015.

* cited by examiner

HOLE PLUG

RELATED APPLICATIONS

The present application is National Phase of International Application No. PCT/JP2012/079162filed Nov. 9, 2012,and claims priority from Japanese Applications No. 2011-250796, filed Nov. 16, 2011 and No. 2012-136046, filed Jun. 15, 2012.

FIELD OF TECHNOLOGY

The present invention relates to a hole plug coving a hole drilled in an attachment member.

BACKGROUND ART

Conventionally, as for a hole plug, there is, for example, Patent Document 1. In this conventional technology, the hole plug comprises a cylindrical outer circumferential wall face extending downward from an inner circumferential edge portion of a flange portion covering a hole edge circumferential face of an attachment hole drilled in the attachment member; and an inner circumferential wall face folded inward from a lower end of the outer circumferential wall face, and expended upward. Then, engagement claws formed in a plurality of engagement protrusions radially formed on the outer circumferential wall face engage with the attachment hole.

PRIOR ART DOCUMENT

Patent Document

Patent Document 1: Japanese Utility Model Publication No. H02-008867

SUMMARY OF THE INVENTION

Problems to be Solved by the Invention

The present invention provides the hole plug which can reduce an insertion force into the attachment hole, and can increase a removal force from the attachment hole.

Means for Solving the Problems

The first aspect of the present invention provides a hole plug comprising an annular flange portion covering a hole edge circumferential face of an attachment hole drilled in an attachment member; a cylindrical outer circumferential wall portion extending downward from an inner circumferential edge portion of the flange portion; engagement claws formed to protrude on an outer wall face of the outer circumferential wall portion, and engaging with the attachment hole; a cylindrical intermediate wall portion extended in an up-and-down direction at an interval inside the outer circumferential wall portion; a cylindrical inner circumferential wall portion extended in the up-and-down direction at an interval inside the intermediate wall portion; a face plate closing an upper-end inside of the inner circumferential wall portion; a connection portion connecting the intermediate wall portion to the inner circumferential wall portion; and an abutment portion connecting a lower end of the outer circumferential wall portion to a lower end of the intermediate wall portion, wherein when a force acts upward from below on the face plate and the face plate moves upward, an outside portion is folded inward, and an inside portion abuts against an inside face of a portion of the outer circumferential wall portion in which the engagement claw is formed.

In the aforementioned aspect, in a case wherein the force acts upward from below on the face plate of the hole plug and the face plate moves upward, the inner circumferential wall portion is pushed up together with the face plate. Consequently, the intermediate wall portion connected to the inner circumferential wall portion by the connection portion moves upward relative to the outer circumferential wall portion fixed in the attachment hole of the attachment member by the flange portion and the engagement claw. As a result, the outside portion of the abutment portion connecting the lower end of the outer circumferential wall portion to the lower end of the intermediate wall portion is folded inward, and the inside portion of the abutment portion abuts against the inside face of the portion of the outer circumferential wall portion in which the engagement claws are formed. Therefore, the inside portion of the abutment portion can control the engagement claws from deforming inward. Consequently, the engagement claws become difficult to be detached from the attachment hole. As a result, a removal force of the hole plug from the attachment hole can increase. On the other hand, when the hole plug is inserted into the attachment hole, since the intermediate wall portion is not moved upward relative to the outer circumferential wall portion, the inside portion of the abutment portion does not abut against the inside face of the portion of the outer circumferential wall portion in which the engagement claw is formed. Consequently, the engagement claws slide along the attachment hole, so that the outer circumferential wall portion easily deforms inward together with the engagement claws. As a result, while maintaining the removal force large, an insertion force into the attachment hole can be reduced.

As for a second aspect of the present invention, in the first aspect of the present invention, in the abutment portion, rigidity of the outside portion may be reduced as compared to rigidity of the inside portion and rigidity of the intermediate wall portion. Also, the outside portion may incline toward an outward upper side from an outside end of the inside portion.

In the aforementioned aspect, the rigidity of the outside portion of the abutment portion is reduced as compared to the rigidity of the inside portion and the rigidity of the intermediate wall portion. Also, the outside portion inclines toward the outward upper side from the outside end of the inside portion. Consequently, in a case wherein the force acts upward from below on the inside portion of the abutment portion, the outside portion of the abutment portion is pushed out to the outward upper side, and pushes the portion of the outer circumferential wall portion in which the engagement claw is formed outward, so that the engagement claw becomes difficult to be detached from the attachment hole. As a result, even in a case wherein the removal force acts upward from below on the inside portion of the abutment portion, the removal force of the hole plug from the attachment hole can increase.

As for a third aspect of the present invention, in the first or second aspect of the present invention, there may be included a concave portion formed in the abutment portion, and becoming a starting point when the outside portion is folded inward.

In the aforementioned aspect, when the outside portion of the abutment portion of the hole plug is folded inward, as the starting point of the concave portion formed in the abutment portion, the outside portion of the abutment portion is reliably folded inward.

As for a fourth aspect of the present invention, in any one of the first to third aspects of the present invention, at a center portion in an up-and-down direction of the inner circumferential wall portion, the intermediate wall portion and the inner circumferential wall portion may be connected by the connection portion.

In the aforementioned aspect, at the center portion in the up-and-down direction of the inner circumferential wall portion of the hole plug, the intermediate wall portion and the inner circumferential wall portion are connected by the connection portion so as to allow an inward deformation of the intermediate wall portion to be controlled by the connection portion. Also, by controlling the inward deformation of the intermediate wall portion, an inward deformation of the outer circumferential wall portion against which the inside portion of the abutment portion abuts can also be controlled. Consequently, a decline of the removal force of the hole plug can be prevented.

As for a fifth aspect of the present invention, in any one of the first to fourth aspects of the present invention, the engagement claws may be formed at predetermined intervals along a circumferential direction of an outer wall face of the outer circumferential wall portion.

In the aforementioned aspect, the engagement claws of the hole plug are formed at the predetermined intervals along the circumferential direction of the outer wall face of the outer circumferential wall portion. Consequently, an increase of the insertion force of the hole plug into the attachment hole can be prevented.

As for a sixth aspect of the present invention, in the fifth aspect of the present invention, at a portion of the face plate which becomes an inside of the engagement claws, there may be included ribs respectively formed along a radial direction of the face plate.

In the aforementioned aspect, at the portion of the face plate which becomes the inside of the engagement claws of the hole plug, the ribs are respectively formed along the radial direction of the face plate. Consequently, the ribs can control inward deformations of the face plate at the portion which becomes the insides of the engagement claws and the inner circumferential wall portion. As a result, by controlling the inward deformation of the intermediate wall portion connected to the inner circumferential wall portion by the connection portion, the inward deformation of the outer circumferential wall portion against which the inside portion of the abutment portion abuts can also be controlled. Consequently, the decline of the removal force of the hole plug can be prevented.

As for a seventh aspect of the present invention, in any one of the first to sixth aspects of the present invention, there may be included a protrusion portion formed in an upper end of the intermediate wall portion, and protruding to an upper side of the connection portion.

In the aforementioned aspect, in the upper end of the intermediate wall portion of the hole plug, there is formed the protrusion portion protruding to the upper side of the connection portion. Consequently, in a case wherein the hole plug is viewed from above, the protrusion portion can reduce a groove portion formed between the flange portion covering the hole edge circumferential face of the attachment hole drilled in the attachment member and the face plate closing the upper-end inside of the inner circumferential wall portion. As a result, a quality of external appearance of the hole plug can be improved.

As for an eighth aspect of the present invention, in any one of the first to seventh aspects of the present invention, there may be included a convex portion formed in a ring shape at a center portion of the face plate, and connected to the rib.

In the aforementioned aspect, by pressing the convex portion formed in the ring shape at the center portion of the face plate, and connected to the rib, the hole plug can be easily taken out of a forming die.

Effect of the Invention

The first aspect of the present invention has the aforementioned structure so as to allow the insertion force into the attachment hole to decrease, and to allow the removal force from the attachment hole to increase.

The second aspect of the present invention has the aforementioned structure so as to allow the removal force of the hole plug from the attachment hole to increase even in the case wherein the removal force acts upward from below on the inside portion of the abutment portion.

The third aspect of the present invention has the aforementioned structure so as to allow the abutment portion to reliably deform.

The fourth aspect of the present invention has the aforementioned structure so as to prevent the decline of the removal force from the attachment hole.

The fifth aspect of the present invention has the aforementioned structure so as to prevent the increase of the insertion force into the attachment hole.

The sixth aspect of the present invention has the aforementioned structure so as to prevent the decline of the removal force from the attachment hole.

The seventh aspect of the present invention has the aforementioned structure so as to improve the quality of external appearance.

The eighth aspect of the present invention has the aforementioned structure so as to be easily taken out of the forming die.

BEST MODES OF CARRYING OUT THE INVENTION (First Embodiment)

Next, the first embodiment of a hole plug of the present invention will be explained according to FIG. 1 to FIG. 8.

Incidentally, in the figures, the same symbols are assigned to members (structural elements) having the same or corresponding functions, and their explanations are suitably omitted. Also, in the figures, an arrow UP suitably shown in the figures represents an upper side.

Figure 3:
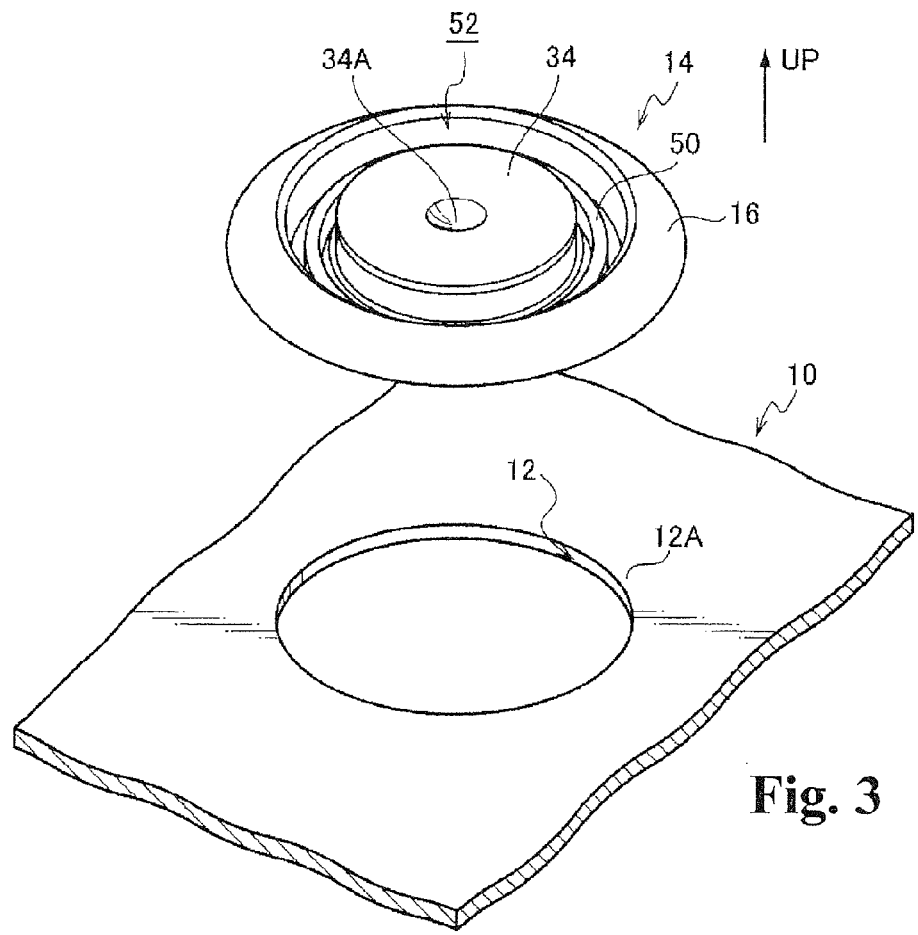
FIG. 3 is a perspective view showing the state before the hole plug is inserted into the attachment hole, and viewed obliquely from above according to the first embodiment of the present invention.
Figure 4:
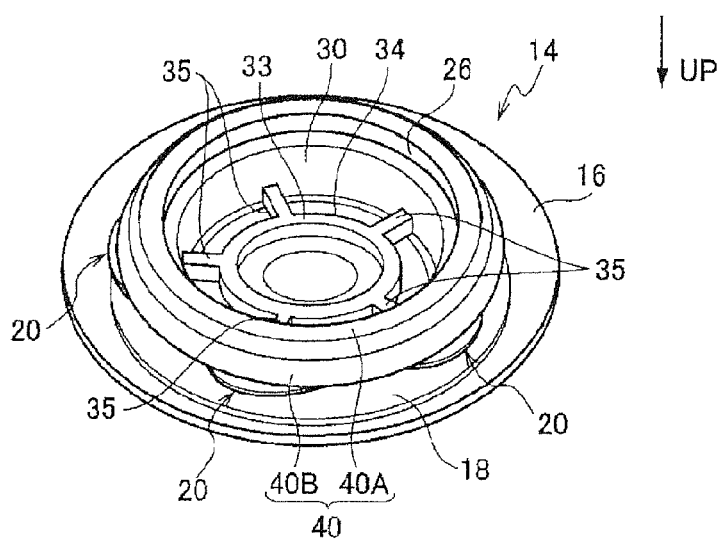
FIG. 4 is a perspective view showing the state before the hole plug is inserted into the attachment hole, and viewed obliquely from below according to the first embodiment of the present invention.

As shown in FIG. 3, an attachment hole 12 is drilled in a body panel 10 (an attachment member) of an automobile as one example of the attachment member. In the attachment hole 12, there can be inserted a hole plug 14 formed by a synthetic resin, and the attachment hole 12 is closed by the hole plug 14.

Figure 2:
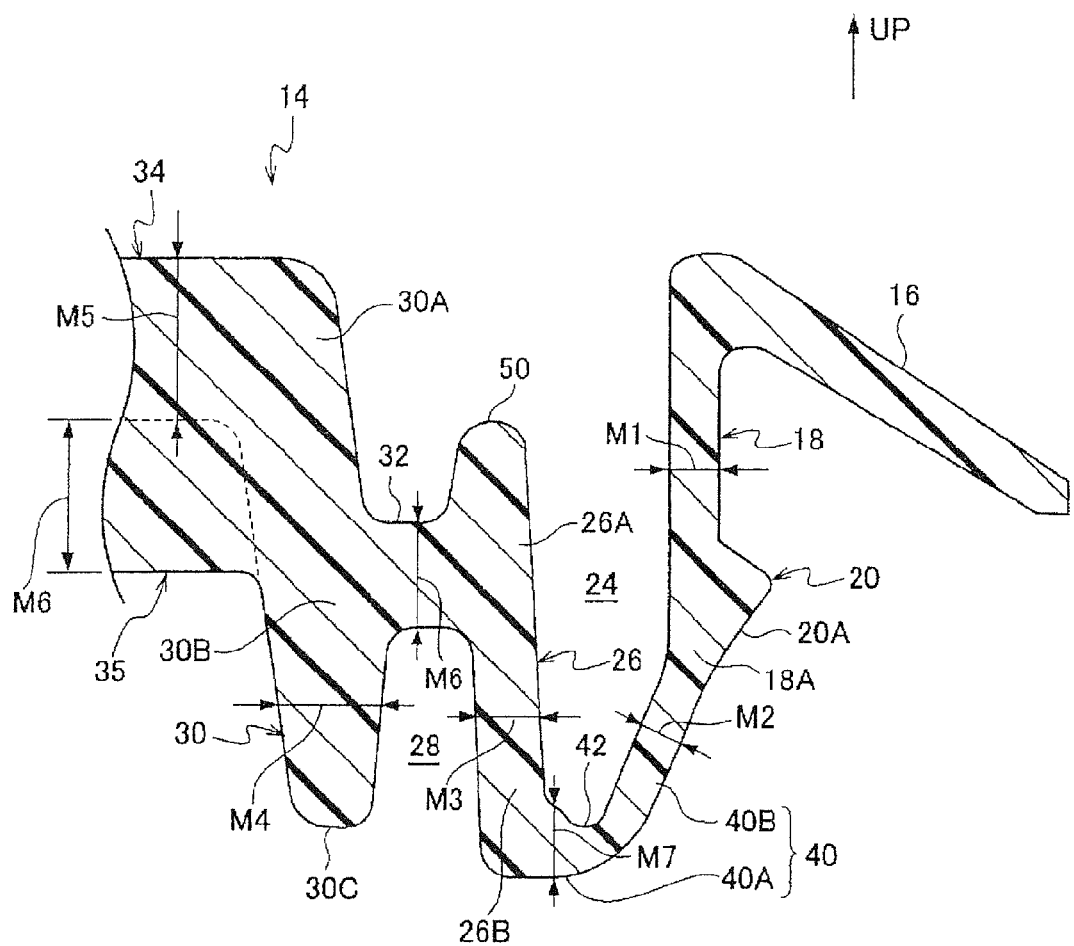
FIG. 2 is an enlarged cross-sectional side view showing one portion in FIG. 1.
Figure 7:
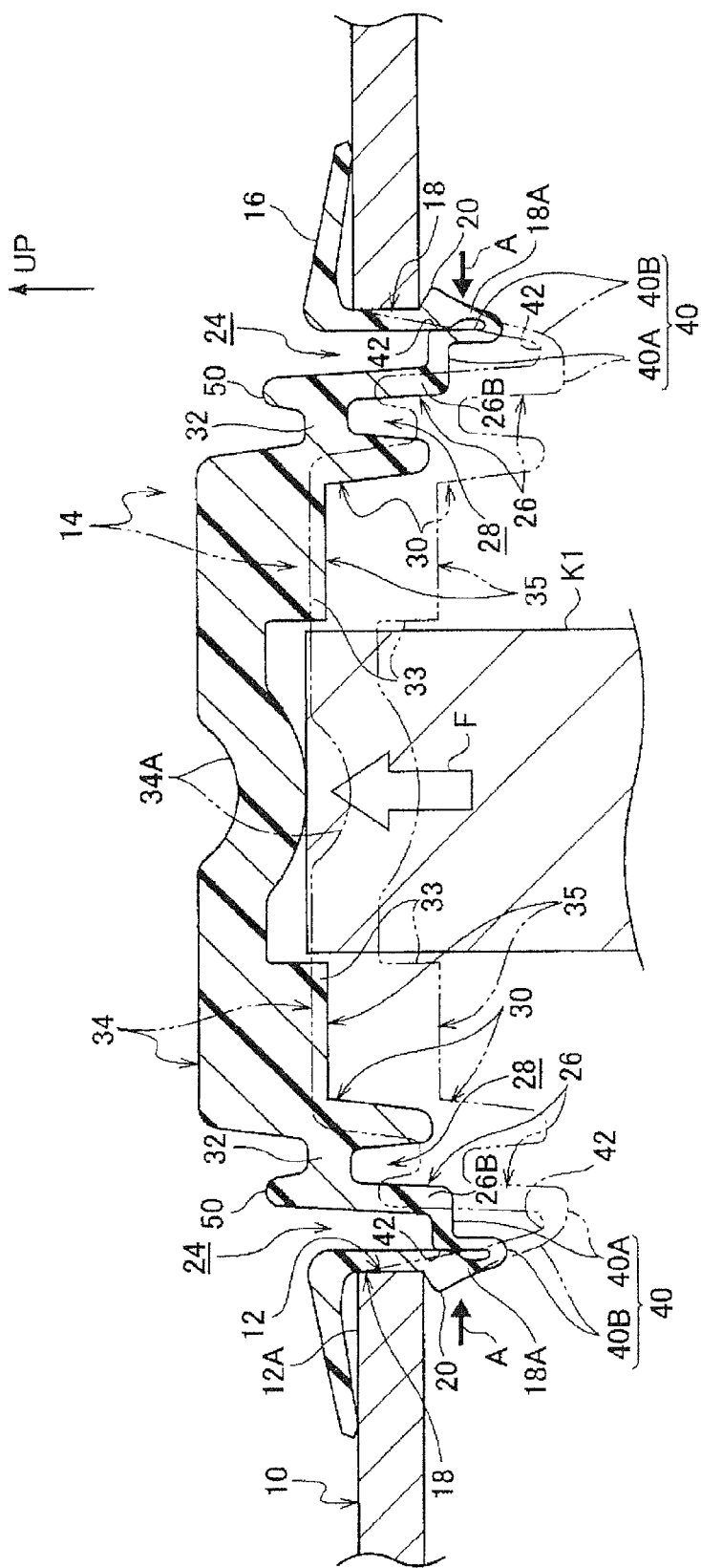
FIG. 7 is an enlarged cross-sectional side view taken along a cross-sectional line 7-7 in FIG. 5, and showing a state wherein a removal force acts on a face plate of the hole plug according to the first embodiment of the present invention.

In an outer circumferential edge portion of the hole plug 14, there is formed a flange portion 16 annularly around an entire circumference with a constant width. Also, as shown in FIG. 2, the flange portion 16 inclines obliquely downward from an upper end of an outer circumferential wall portion 18, and as shown in FIG. 7, in a case wherein the attachment hole 12 is closed by the hole plug 14, the flange portion 16 covers a hole edge circumferential face 12A on an upper face side of the attachment hole 12.

Figure 1:
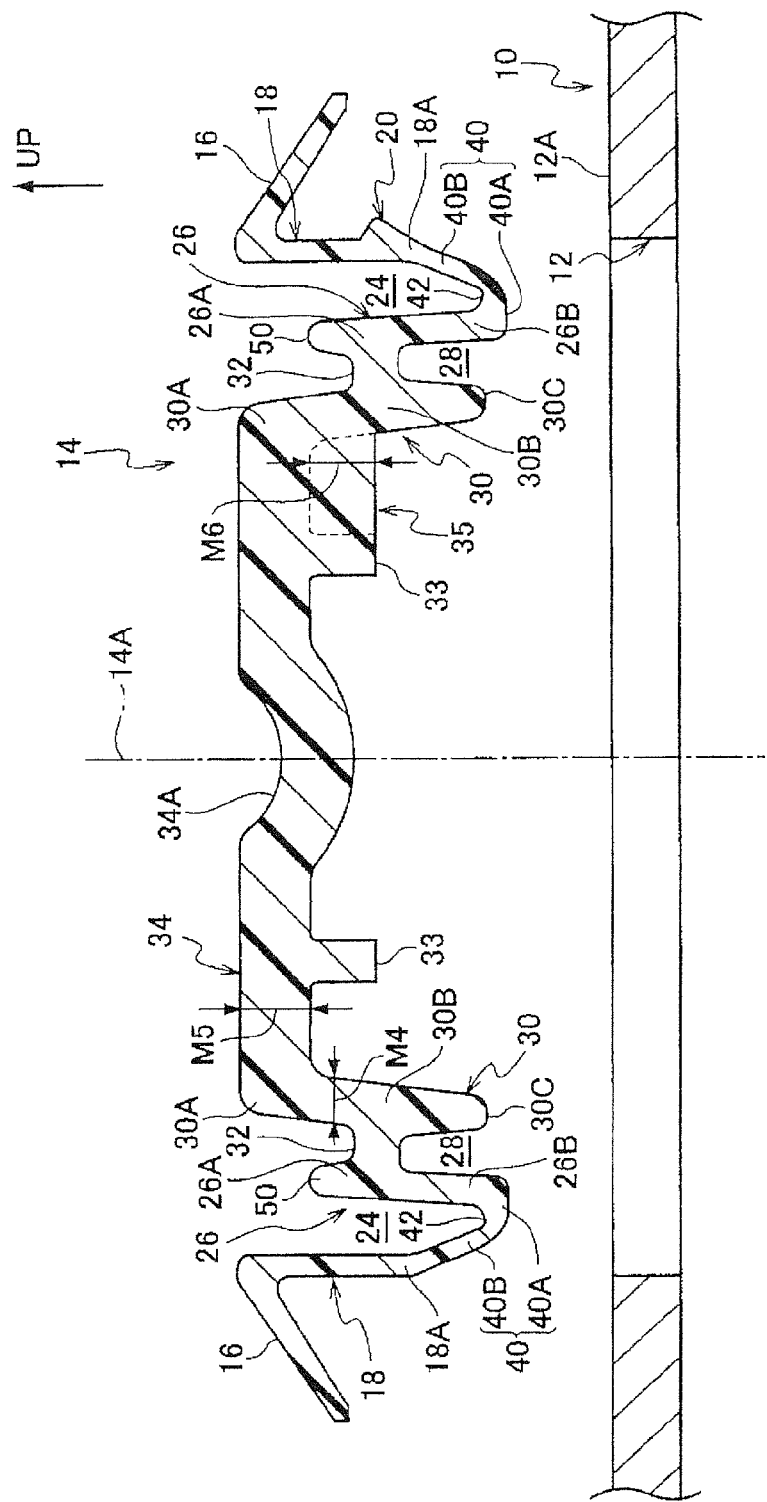
FIG. 1 is an enlarged cross-sectional side view taken along a cross-sectional line 1-1 in FIG. 5, and showing a state before a hole plug is inserted into an attachment hole according to the first embodiment of the present invention.

As shown in FIG. 1, the outer circumferential wall portion 18 of the hole plug 14 is extended in a cylinder shape downward from an inner circumferential edge portion of the flange portion 16. Also, the outer circumferential wall portion 18 is formed in parallel to a shaft center 14A of the hole plug 14, and an engagement claw 20 is formed to protrude on an outer wall face of a lower portion of the outer circumferential wall portion 18.

Figure 5:
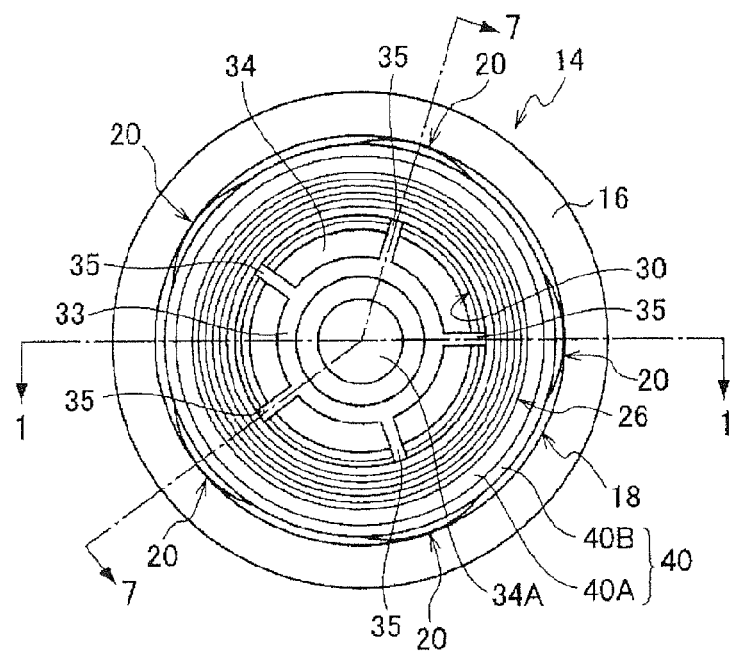
FIG. 5 is a plan view showing the hole plug and viewed from below according to the first embodiment of the present invention.
Figure 6:
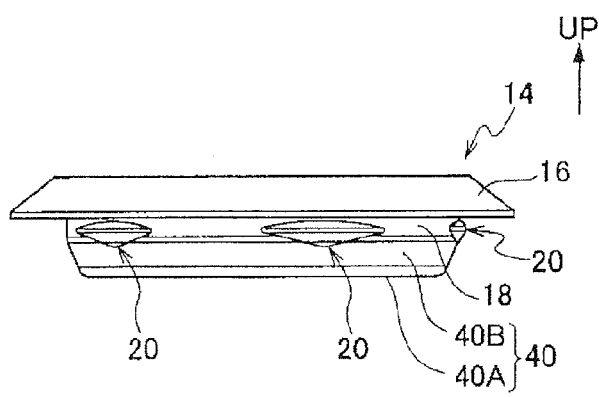
FIG. 6 is a side view showing the hole plug according to the first embodiment of the present invention.

As shown in FIG. 5 and FIG. 6, a plurality of engagement claws 20 is formed at predetermined intervals along a circumferential direction of the outer wall face of the outer circumferential wall portion 18.

As shown in FIG. 5, in the present embodiment, five engagement claws 20 are formed respectively at equal intervals. Also, in a plan view, each engagement claw 20 protrudes in an arc shape outward in a radial direction from the outer wall face of the outer circumferential wall portion 18.

As shown in FIG. 2, an outer circumferential face 20A of the engagement claw 20 extends obliquely to an outward upper side. Consequently, when the hole plug 14 is inserted into the attachment hole 12 of the body panel 10, the outer circumferential face 20A of the engagement claw 20 slides along an inner edge portion of the attachment hole 12, and the engagement claw 20 is elastically deformed inward together with the outer circumferential wall portion 18. Then, when the engagement claw 20 passes through the attachment hole 12, the engagement claw 20 moves outward by a restoring force of the outer circumferential wall portion 18, and as shown in FIG. 7, each engagement claw 20 engages a circumferential edge portion on a lower side of the attachment hole 12.

Inside the outer circumferential wall portion 18, a cylindrical intermediate wall portion 26 is extended in an up-and-down direction at an interval 24. The intermediate wall portion 26 is formed in parallel to the shaft center 14A of the hole plug 14, and a thickness M3 of the intermediate wall portion 26 is thicker compared to a thickness M1 of the outer circumferential wall portion 18 (M3>M1).

Also, inside the intermediate wall portion 26, a cylindrical inner circumferential wall portion 30 is extended in the up-and-down direction at an interval 28. The inner circumferential wall portion 30 is formed in parallel to the shaft center 14A of the hole plug 14, and a thickness M4 of the inner circumferential wall portion 30 is thicker compared to the thickness M3 of the intermediate wall portion 26 (M4>M3). Also, the thickness M4 of the inner circumferential wall portion 30 gradually becomes thinner downward from above, and the interval 28 gradually expands downward from above.

As shown in FIG. 1, an inside of an upper end portion 30A of the inner circumferential wall portion 30 is closed by a circular face plate 34. A thickness M5 of the face plate 34 is thicker compared to the thickness M4 of the inner circumferential wall portion 30 (M5>M4). Also, a center portion 34A of the face plate 34 is curved downward in a hemispherical shape.

At a position separated from the center portion 34A to an outer circumferential side on a lower face of the face plate 34 of the hole plug 14, there is formed a convex portion 33 to protrude in a ring shape. Also, on the lower face of the face plate 34 which becomes an inside of each engagement claw 20, there are respectively formed ribs 35 connecting an outer circumferential face of the convex portion 33 to a center portion 30B in the up-and-down direction of the inner circumferential wall portion 30. A thickness M6 of each rib 35 is approximately equal to the thickness M5 of the face plate 34 (M6≈M5), and a thickness of the face plate 34 at a portion wherein the rib 35 is formed is M5+M6. Consequently, by the rib 35, at a portion which becomes the inside of the engagement claw 20, rigidity of the face plate 34 is increased so as to allow an inward deformation of the inner circumferential wall portion 30 to be controlled. Moreover, the convex portion 33 is pressed so as to allow the hole plug 14 to be easily taken out of a forming die.

As shown in FIG. 2, an upper portion 26A of the intermediate wall portion 26 is located at the inside (at the same height position) of the engagement claw 20, and the upper portion 26A of the intermediate wall portion 26 and the center portion 309 in the up-and-down direction of the inner circumferential wall portion 30 are connected by a connection portion 32 at the inside of the engagement claw 20. Also, a lower end 30C of the inner circumferential wall portion 30 is positioned slightly upward more than a lower end 26B of the intermediate wall portion 26. Incidentally, a thickness M6 of the connection portion 32 is thicker compared to the thickness M3 of the intermediate wall portion 26 (M6>M3), and is thinner compared to the thickness M5 of the face plate 34 (M6<M5).

The lower end 26B of the intermediate wall portion 26 and a lower end 18A of the outer circumferential wall portion are connected by an abutment portion 40, and an inside portion 40A of the abutment portion 40 is located on a lower side more than the lower end 30C of the inner circumferential wall portion 30, and is positioned on a lowest side of the hole plug 14. Also, the inside portion 40A of the abutment portion 40 is extended outward in a radial direction of the hole plug 14 from a lower side of the lower end 26B of the intermediate wall portion 26. On the other hand, an outside portion 40B of the abutment portion 40 is extended toward an outward upper side from an outside end of the inside portion 40A, and extends downward to the lower end 18A of the outer circumferential wall portion 18. Namely, the outside portion 40B of the abutment portion 40 inclines toward the outward upper side from the outside end of the inside portion 40A. Also, compared to the thickness M1 of the outer circumferential wall portion 18, a thickness M2 of the outside portion 40B of the abutment portion is reduced (M1>M2); and a thickness M7 of the inside portion 40A of the abutment portion 40 is increased compared to the thickness M2 of the outside portion 40B, and approximately is equal to the thickness M3 of the intermediate wall portion (M7≈M3>M2). Namely, the thickness M2 of the outside portion 40B is reduced compared to the thickness M7 of the inside portion 40A and the thickness M3 of the intermediate wall portion 26 (M2<M3≈M7), and rigidity of the outside portion 40B is reduced more than the rigidity of the inside portion 40A and the rigidity of the intermediate wall portion 26.

Also, in the present embodiment, on an upward side of a border between the outside portion 40B and the inside portion 40A in the abutment portion 40, there is formed a concave portion 42, and a thickness of a portion wherein the concave portion 42 is formed is reduced more than the thickness M2 of the outside portion 40B.

As shown with dashed-two dotted lines in FIG. 7, in a state wherein the hole plug 14 is attached to the body panel 10, for example, in a case wherein a removal force (an arrow F in FIG. 7) acts upward from below on the face plate 34 by abutting a pressing body K1 against the face plate 34 of the hole plug 14 upward from below and the like, as shown with solid lines in FIG. 7, the face plate 34 of the hole plug 14 is pressed upward. At that time, since the outer circumferential wall portion 18 is fixed in the attachment hole 12 of the body panel 10 by the flange portion 16 and the engagement claw 20, the intermediate wall portion 26 is pressed upward relative to the outer circumferential wall portion 18. Consequently, the outside portion 40B of the abutment portion 40 is folded inward approximately at a center, and the inside portion 40A of the abutment portion 40 abuts against an inside face of the lower portion of the outer circumferential wall portion 18. As a result, the inside portion 40A of the abutment portion 40 can control the engagement claw 20 from deforming inward (an arrow A direction in FIG. 7).

Also, as shown with dashed-two dotted lines in FIG. 8, in a state wherein the hole plug 14 is attached to the body panel 10, for example, in a case wherein the removal force (an arrow F in FIG. 8) acts upward from below on the inside portion 40A of the abutment portion 40 by abutting a pressing body K2 against the inside portion 40A of the abutment portion 40 positioned on the lowest side of the hole plug 14 upward from below and the like, as shown with solid lines in FIG. 8, the abutment portion 40 of the hole plug 14 is pressed upward. At that time, the thickness M2 of the outside portion 40B is reduced compared to the thickness M7 of the inside portion 40A and the thickness M3 of the intermediate wall portion 26 (M2<M3=M7), and the rigidity of the outside portion 40B is reduced more than the rigidity of the inside portion 40A and the rigidity of the intermediate wall portion 26. Also, the outside portion 40B inclines toward the outward upper side from the outside end of the inside portion 40A. Consequently, the outside portion 40B of the abutment portion 40 is pushed out in an outward upper direction (an arrow B direction in FIG. 8), and the lower portion of the outer circumferential wall portion 18 in which the engagement claw 20 is formed is pushed outward (a direction opposite to an arrow A in FIG. 8). As a result, the outside portion 40B of the abutment portion 40 can control the engagement claw 20 from deforming inward (an arrow A direction in FIG. 8).

As shown in FIG. 2, in the hole plug 14 of the present embodiment, at an upper end of the intermediate wall portion 26, there is formed a protrusion portion 50 protruding to an upper side of the connection portion 32. Consequently, as shown in FIG. 3, in a case wherein the hole plug 14 is viewed from above, a groove portion 52 formed between the flange portion 16 and the face plate 34 can be reduced by the protrusion portion 50.

(Operation and Effect)

Next, an operation and an effect of the present embodiment will be explained.

In the present embodiment, when the hole plug 14 is inserted into the attachment hole 12 of the body panel 10, the outer circumferential face 20A of the engagement claw 20 slides along the inner edge portion of the attachment hole 12; the outer circumferential wall portion 18 elastically deforms inward (an intermediate wall portion 26 side); and the engagement claw 20 moves inward. Then, when the engagement claw 20 passes through the attachment hole 12, each engagement claw 20 moves outward by the restoring force of the outer circumferential wall portion 18, and as shown in FIG. 7, each engagement claw 20 is engaged with the circumferential edge portion on the lower side of the attachment hole 12. Also, the flange portion 16 of the hole plug 14 covers the hole edge circumferential face 12A on the upper face side of the attachment hole 12, so that the hole plug 14 is attached to the attachment hole 12.

On the other hand, as shown with the dashed-two dotted lines in FIG. 7, in the state wherein the hole plug 14 is attached to the body panel 10, for example, in the case wherein the removal force (the arrow F in FIG. 7) acts upward from below on the face plate 34 by abutting the pressing body K1 against the face plate 34 of the hole plug 14 upward from below and the like, as shown with the solid lines in FIG. 7, the face plate 34 of the hole plug 14 is pressed upward. Also, when the face plate 34 of the hole plug 14 is pushed upward, the intermediate wall portion 26 moves upward relative to the outer circumferential wall portion 18 fixed in the attachment hole 12 of the body panel 10 by the flange portion 16 and the engagement claw 20.

As a result, the outside portion 40B of the abutment portion 40 bends downward as a starting point of the concave portion 42, and is folded inward approximately at the center. Thereby, the inside portion 40A of the abutment portion 40 abuts against the inside face of the portion (the lower portion of the outer circumferential wall portion 18) of the outer circumferential wall portion 18 in which the engagement claw 20 is formed. Incidentally, when the outside portion 40B of the abutment portion 40 is folded inward approximately at the center, the lower end 26B of the intermediate wall portion 26 elastically deforms inward using the interval 28, so that the outside portion 40B of the abutment portion 40 is reliably folded.

Therefore, the inside portion 40A of the abutment portion 40 can control the engagement claw 20 from deforming inward. Consequently, the hole plug 14 becomes difficult to be detached from the attachment hole 12 so as to allow the removal force to increase.

Also, as shown with the dashed-two dotted lines in FIG. 8, in the state wherein the hole plug 14 is attached to the body panel 10, for example, in the case wherein the removal force (the arrow F in FIG. 8) acts upward from below on the inside portion 40A of the abutment portion 40 by abutting the pressing body K2 against the inside portion 40A of the abutment portion 40 positioned on the lowest side of the hole plug 14 upward from below and the like, as shown with the solid lines in FIG. 8, the abutment portion 40 of the hole plug 14 is pressed upward. At that time, the thickness M2 of the outside portion 40B is reduced compared to the thickness M7 of the inside portion 40A and the thickness M3 of the intermediate wall portion 26 (M2<M3≈M7), and the rigidity of the outside portion 40B is reduced more than the rigidity of the inside portion 40A and the rigidity of the intermediate wall portion 26. Also, the outside portion 40B inclines toward the outward upper side from the outside end of the inside portion 40A. Consequently, the outside portion 40B of the abutment portion 40 is pushed out in the outward upper direction (the arrow B direction in FIG. 8), and the lower portion of the outer circumferential wall portion 18 in which the engagement claw 20 is formed is pushed outward (the direction opposite to the arrow A in FIG. 8).

Figure 8:
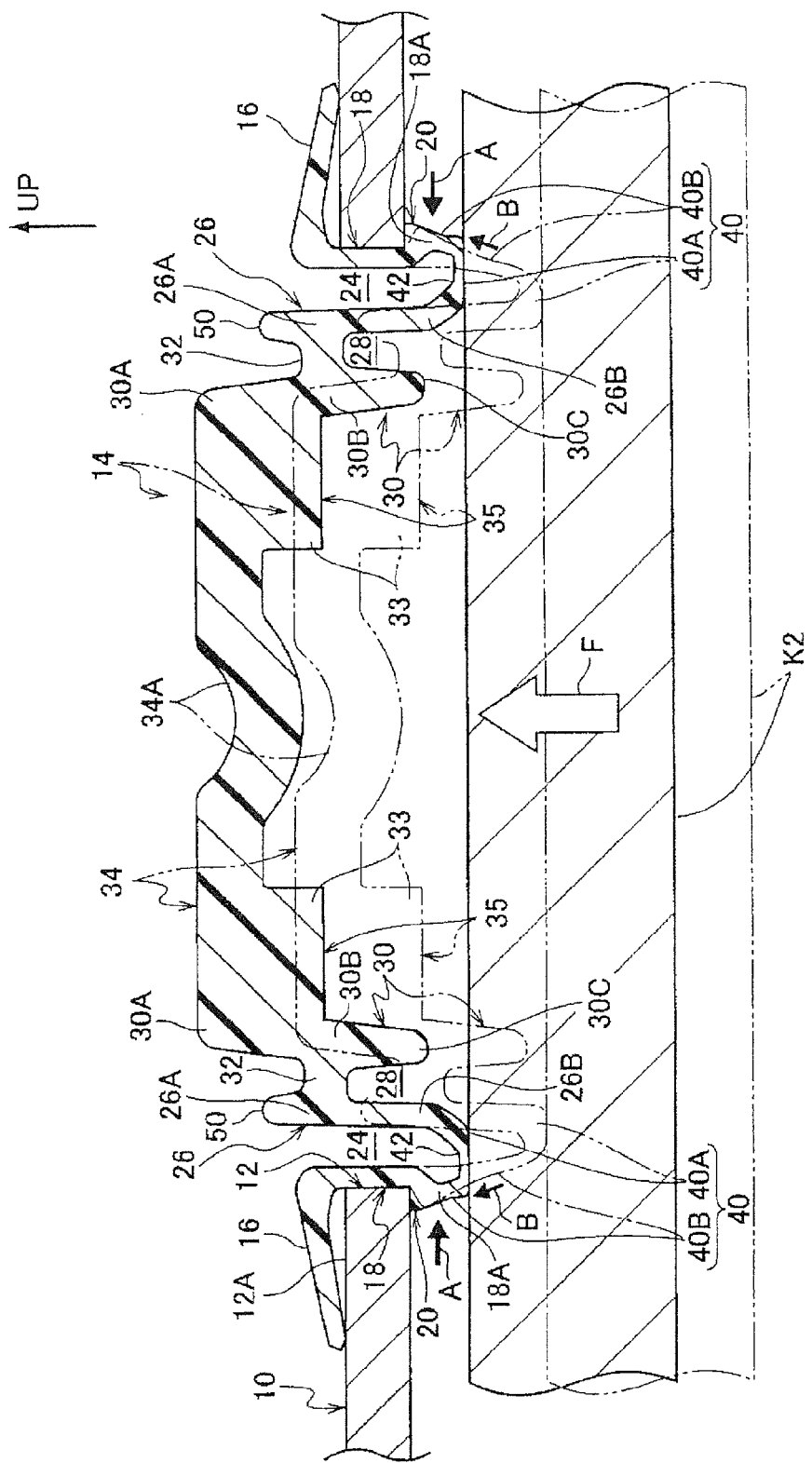
FIG. 8 is an enlarged cross-sectional side view taken along a cross-sectional line 7-7 in FIG. 5, and showing a state wherein the removal force acts on an abutment portion of the hole plug according to the first embodiment of the present invention.

Therefore, the engagement claw 20 can be controlled from deforming inward (the arrow A direction in FIG. 8). Consequently, even in the case wherein the removal force (the arrow F in FIG. 8) acts upward from below on the inside portion 40A of the abutment portion 40, the hole plug 14 becomes difficult to be detached from the attachment hole 12 so as to allow the removal force to increase.

On the other hand, when the hole plug 14 is inserted into the attachment hole 12, the inside portion 40A of the abutment portion 40 does not abut against the inside face of the portion of the outer circumferential wall portion 18 in which the engagement claw 20 is formed. Also, the lower portion of the outer circumferential wall portion 18 in which the engagement claw 20 is formed is not pushed outward. Consequently, the engagement claw 20 slides along the attachment hole 12, so that the outer circumferential wall portion 18 easily deforms elastically inward together with the engagement claw 20. As a result, in the hole plug 14 of the present embodiment, while maintaining the removal force large, an insertion force into the attachment hole can be reduced. Also, while maintaining the removal force large, the insertion force into the attachment hole can be reduced so as to expand a hole diameter allowable width of the attachment hole 12 closed by the hole plug 14.

Also, in the present embodiment, the outside portion 40B of the abutment portion 40 bends downward as the starting point of the concave portion 42, and is folded inward approximately at the center. Consequently, the outside portion 40B of the abutment portion 40 can be reliably folded by the concave portion 42.

Also, in the present embodiment, at a center portion in the up-and-down direction of the inner circumferential wall portion 30 of the hole plug 14, the intermediate wall portion 26 and the inner circumferential wall portion 30 are connected by the connection portion 32. Consequently, an inward deformation of the intermediate wall portion 26 can be controlled by the connection portion 32. Also, by controlling the inward deformation of the intermediate wall portion 26, an inward deformation of the outer circumferential wall portion 18 against which the inside portion 40A of the abutment portion 40 folded inward abuts can be also controlled. Consequently, an inward deformation of the engagement claw 20 can be controlled so as to prevent a reduction of the removal force of the hole plug 14.

Also, in the present embodiment, the plurality of engagement claws 20 of the hole plug 14 is formed at the predetermined intervals along the circumferential direction. Consequently, compared to a structure wherein the engagement claws 20 are continuously formed around an entire circumference along the circumferential direction of the outer circumferential wall portion 18 of the hole plug 14, the insertion force of the hole plug 14 into the attachment hole 12 can be reduced. As a result, an increase of the insertion force of the hole plug 14 into the attachment hole 12 can be prevented.

Also, in the present embodiment, on the lower face of the face plate 34 which becomes the inside of each engagement claw 20 of the hole plug 14, there are respectively formed the ribs 35 along the radial direction of the hole plug 14. Consequently, by each rib 35, inward deformations of the face plate 34 and the inner circumferential wall portion 30 can be controlled at the portion which becomes the inside of the engagement claw 20. Also, by controlling the inward deformation of the intermediate wall portion 26, the inward deformation of the outer circumferential wall portion 18 against which the inside portion 40A of the abutment portion 40 folded inward abuts can also be controlled. As a result, the inward deformation of the engagement claw 20 can be controlled so as to prevent the reduction of the removal force of the hole plug 14.

Also, in the hole plug 14 of the present embodiment, at the position separated from the outer circumferential side of the center portion 34A on the lower face of the face plate 34, there is formed the convex portion 33 in the ring shape. Consequently, by pressing the convex portion 33, the hole plug 14 can be easily taken out of the forming die.

Also, in the hole plug 14 of the present embodiment, at the upper end of the intermediate wall portion 26, there is formed the protrusion portion 50 protruding to the upper side of the connection portion 32. Consequently, as shown in FIG. 3, in the case wherein the hole plug 14 is viewed from above, the groove portion 52 formed between the flange portion 16 and the face plate 34 can be reduced by the protrusion portion 50. As a result, a quality of external appearance of the hole plug 14 can be improved so as to improve a design property.

(Second Embodiment)

Figure 10:
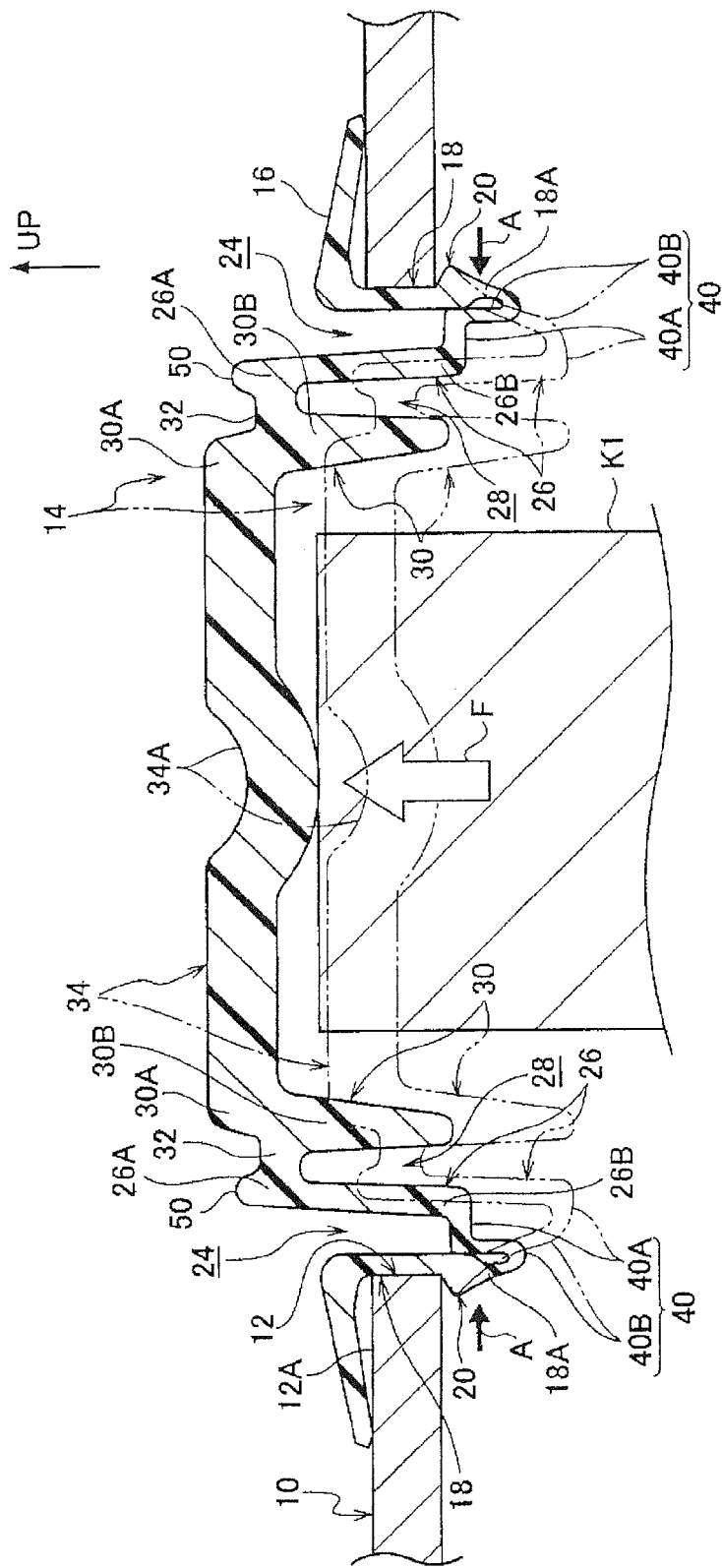
FIG. 10 is an enlarged cross-sectional side view showing a state wherein the removal force acts on the face plate of the hole plug, and corresponding to FIG. 7 according to the second embodiment of the present invention.
Figure 11:
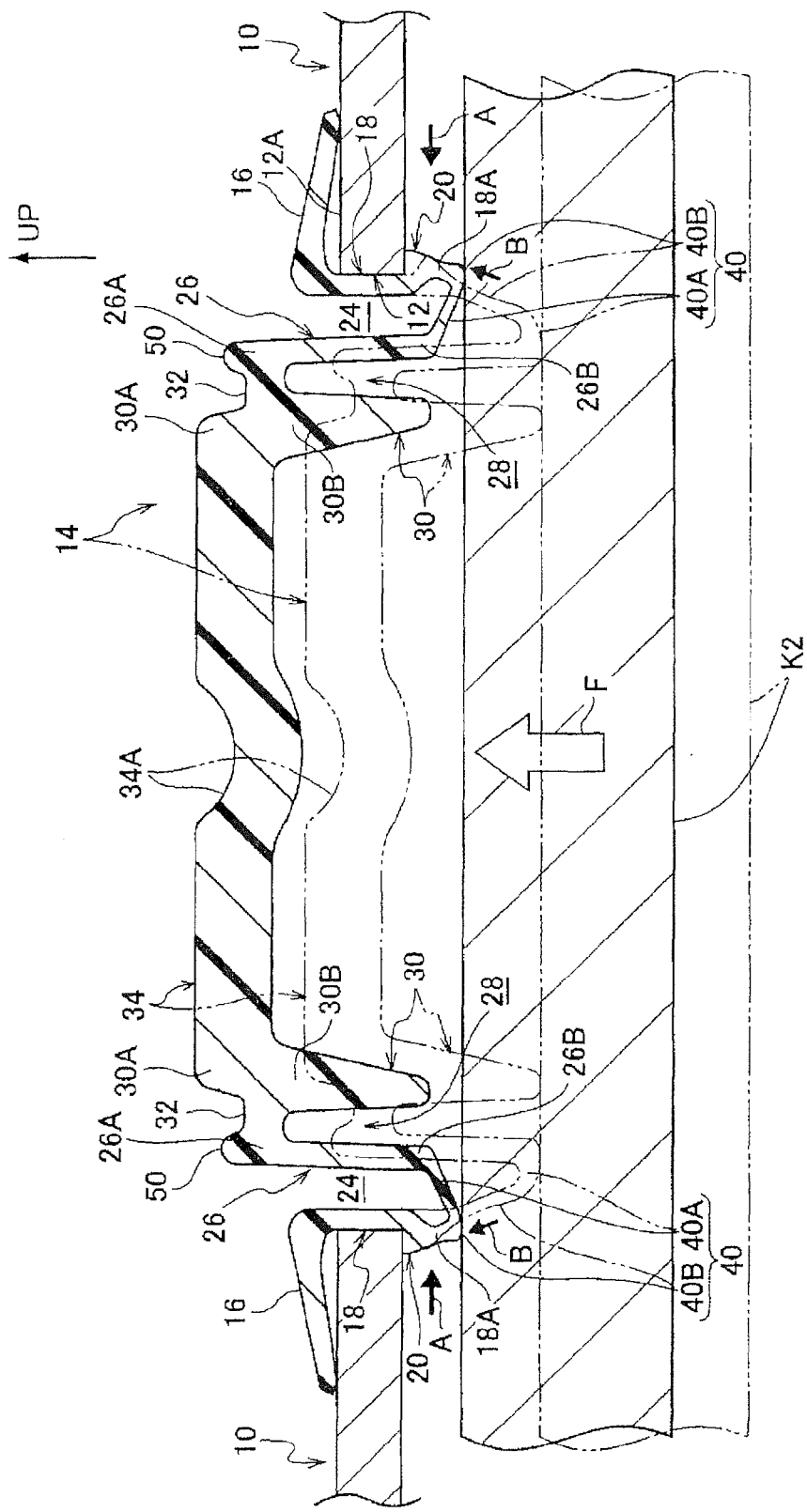
FIG. 11 is an enlarged cross-sectional side view showing a state wherein the removal force acts on the abutment portion of the hole plug, and corresponding to FIG. 8 according to the second embodiment of the present invention.

Next, a second embodiment of the hole plug of the present invention will be explained according to FIG. 9 to FIG. 11.

Incidentally, the same symbols are assigned to members same as the first embodiment, and their explanations are omitted.

Figure 9:
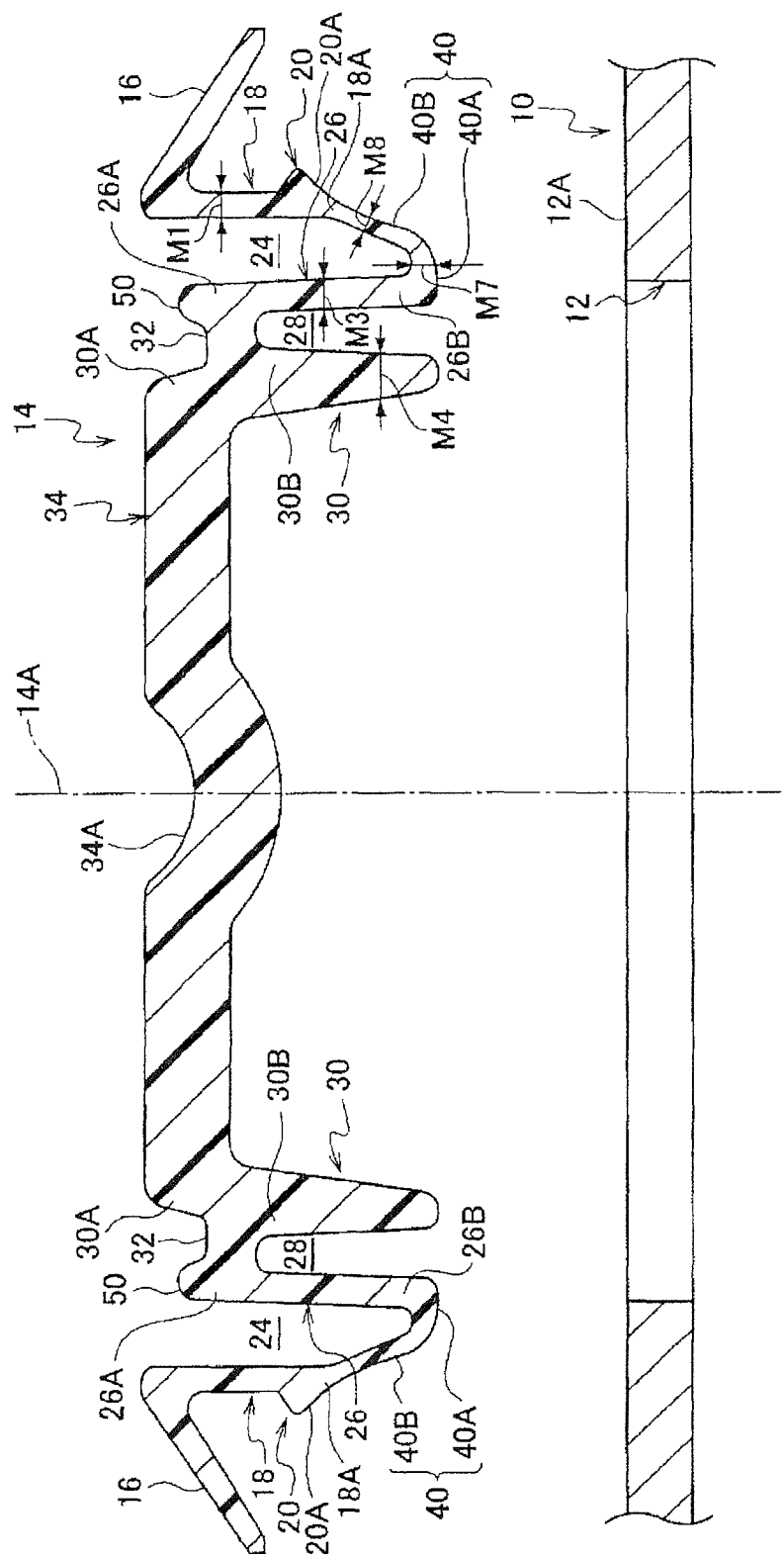
FIG. 9 is an enlarged cross-sectional side view showing the hole plug and corresponding to FIG. 1 according to a second embodiment of the present invention.

As shown in FIG. 9, in the hole plug 14 of the present embodiment, in place of the concave portion 42 of the first embodiment, a thickness M8 of the outside portion 40B of the abutment portion 40 is reduced as compared to the thickness M7 of the inside portion 40A and the thickness M3 of the intermediate wall portion 26 (M2<M3≈M7), and the rigidity of the outside portion 40B is reduced more than the rigidity of the inside portion 40A and the rigidity of the intermediate wall portion 26. Moreover, the thickness M8 of the outside portion 40B of the abutment portion 40 is gently reduced toward a center portion in the up-and-down direction from both ends in the up-and-down direction, and the center portion in the up-and-down direction becomes the thinnest.

Also, the upper portion 26A of the intermediate wall portion 26 is located on an upper side than the engagement claw 20, and vicinities of the upper portion 26A of the intermediate wall portion 26 and the upper end portion 30A of the inner circumferential wall portion 30 are connected by the connection portion 32.

As shown with dashed-two dotted lines in FIG. 10, in the state wherein the hole plug 14 is attached to the body panel 10, for example, in the case wherein the removal force (an arrow F in FIG. 10) acts upward from below on the face plate 34 by abutting the pressing body K1 against the face plate 34 of the hole plug 14 upward from below and the like, as shown with solid lines in FIG. 10, the face plate 34 of the hole plug 14 is pressed upward. At that time, the outer circumferential wall portion 18 is fixed in the attachment hole 12 of the body panel 10 by the flange portion 16 and the engagement claw 20, so that the intermediate wall portion 26 is pressed upward relative to the outer circumferential wall portion 18. Consequently, the thinned outside portion 40B of the abutment portion 40 is bent downward as a starting point of the border between the outside portion 40B and the inside portion 40A, and is folded inward approximately at the center. Consequently, the inside portion 40A of the abutment portion 40 abuts against the inside face of the portion of the outer circumferential wall portion 18 in which the engagement claw 20 is formed. As a result, the inside portion 40A of the abutment portion 40 can control the engagement claw 20 from deforming inward (an arrow A direction in FIG. 10).

Therefore, as in the case of the first embodiment, the removal force of the hole plug 14 from the attachment hole 12 can increase. As a result, even in the hole plug 14 of the present embodiment, while maintaining the removal force large, the insertion force into the attachment hole can be reduced.

Also, As shown with dashed-two dotted lines in FIG. 11, in the state wherein the hole plug 14 is attached to the body panel 10, for example, in the case wherein the removal force (an arrow F in FIG. 11) acts upward from below on the inside portion 40A of the abutment portion 40 by abutting the pressing body K2 against the inside portion 40A of the abutment portion 40 positioned on the lowest side of the hole plug 14 upward from below and the like, as shown with solid lines in FIG. 11, the abutment portion 40 of the hole plug 14 is pressed upward. At that time, the thickness M2 of the outside portion 40B is reduced as compared to the thickness M7 of the inside portion 40A and the thickness M3 of the intermediate wall portion 26 (M2<M3 M7), and the rigidity of the outside portion 402 is reduced more than the rigidity of the inside portion 40A and the rigidity of the intermediate wall portion 26. Also, the outside portion 40B inclines toward the outward upper side from the outside end of the inside portion 40A. Consequently, the outside portion 40B of the abutment portion 40 is pushed out in the outward upper direction (an arrow B direction in FIG. 11), and the lower portion of the outer circumferential wall portion 18 in which the engagement claw 20 is formed is pushed outward (a direction opposite to an arrow A in FIG. 11). As a result, the outside portion 40B of the abutment portion 40 can control the engagement claw 20 from deforming inward (an arrow A direction in FIG. 11). Moreover, the thickness M8 of the outside portion 40B is gently reduced toward the center portion in the up-and-down direction from both ends in the up-and-down direction, and the center portion in the up-and-down direction becomes the thinnest. Consequently, the center portion in the up-and-down direction of the outside portion 40B is bent, so that the outside portion 40B of the abutment portion 40 can be easily pushed outward.

Therefore, as in the case of the first embodiment, even in the case wherein the removal force (the arrow F in FIG. 11) acts upward from below on the inside portion 40A of the abutment portion 40, the hole plug 14 becomes difficult to be detached from the attachment hole 12 so as to allow the removal force to increase.

(Other Embodiments)

Hereinabove, specific embodiments of the present invention have been explained in detail. However, the present invention is not limited to the embodiments described hereinabove, and it is obvious for those skilled in the art that the present invention can be modified to other various embodiments within the subject of the present invention. For example, in each embodiment described hereinabove, the thickness M2 or M8 of the outside portion 40B of the abutment portion 40 of the hole plug is reduced as compared to the thickness M7 of the inside portion 40A and the thickness M3 of the intermediate wall portion 26, so that the rigidity of the outside portion 40B is reduced more than the rigidity of the inside portion 40A and the rigidity of the intermediate wall portion 26. Alternatively, the rigidity of the outside portion 40B may be reduced more than the rigidity of the inside portion 40A and the rigidity of the intermediate wall portion 26 by another structure forming a concave portion or a groove in the outside portion 40B of the abutment portion 40 and the like.

Figure 12:
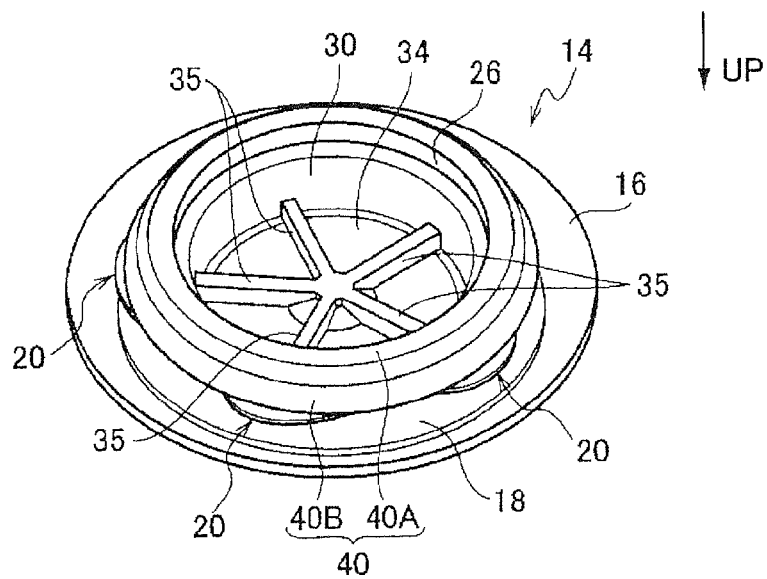
FIG. 12 is a perspective view showing the hole plug and corresponding to FIG. 4 according to a third embodiment of the present invention.
Figure 13:
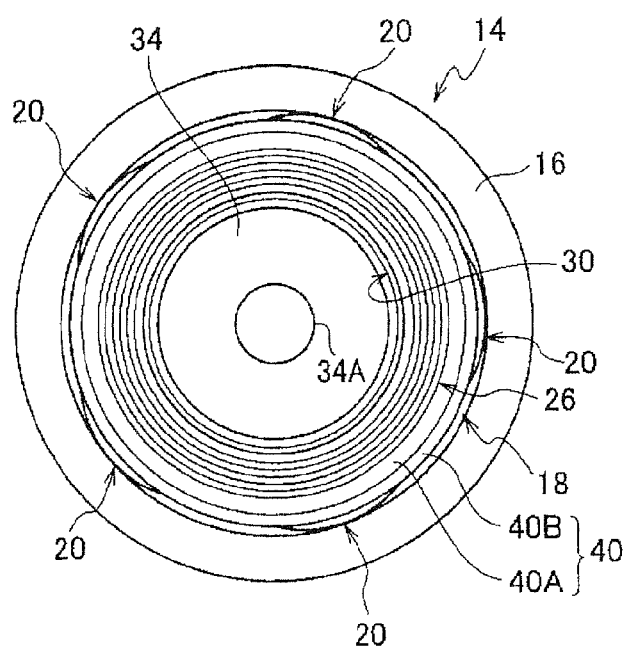
FIG. 13 is a plan view showing the hole plug and corresponding to FIG. 5 according to a fourth embodiment of the present invention.

Also, in each embodiment described hereinabove, on the lower face of the face plate 34 which becomes the inside of each engagement claw 20 in the hole plug 14, the ribs 35 are respectively formed, which connect the outer circumferential face of the convex portion 33 to the center portion 30B in the up-and-down direction of the inner circumferential wall portion 30. However, alternatively, without forming the convex portion 33, there may be used a structure of a third embodiment shown in FIG. 12 in which the ribs 35 connecting the center portion of the face plate 34 to the center portion in the up-and-down direction of the inner circumferential wall portion 30 are respectively formed. Also, there may be used a structure of a fourth embodiment shown in FIG. 13 in which the ribs 35 are not formed.

Also, in each embodiment described hereinabove, although five engagement claws 20 are respectively formed at equal intervals, the plurality of engagement claws 20 may be a number other than five. Also, a shape of the engagement claw 20 in the plan view may be a square and a triangle other than the arc shape. Moreover, the engagement claw 20 may be continuously formed around the entire circumference of the outer circumferential wall portion 18.

Also, in each embodiment described hereinabove, although the protrusion portion 50 protruding to the upper side of the connection portion 32 is formed at the upper end of the intermediate wall portion 26 in the hole plug 14, a structure without forming the protrusion portion 50 may be used.

Also, in each embodiment described hereinabove, although the outer circumferential wall portion 18, the intermediate wall portion 26, and the inner circumferential wall portion 30 of the hole plug 14 have the cylinder shapes, the cylinder shapes may be other cylinder shapes such as an elliptical cylinder shape, a long-hole cylinder shape, and the like.

Also, in each embodiment described hereinabove, a structure in which the hole plug 14 closes the attachment hole 12 formed in the body panel 10 of the automobile as one example of the attachment member has been explained. However, the hole plug 14 of the present invention also can close the attachment hole formed in the attachment member other than the body panel 10 of the automobile.

What is claimed is:
1. A hole plug, comprising:
an annular flange portion for covering a hole edge circumferential face of an attachment hole of an attachment member;
a cylindrical outer circumferential wall portion extending downward from an inner circumferential edge portion of the annular flange portion;

engagement claws formed to protrude on an outer wall face of the outer circumferential wall portion, for engaging with the attachment hole;

a cylindrical intermediate wall portion extended in an up-and-down direction inside the outer circumferential wall portion with an interval therebetween;

a cylindrical inner circumferential wall portion extended in the up-and-down direction inside the cylindrical intermediate wall portion with an interval therebetween;

a face plate closing an upper-end inside the inner circumferential wall portion;

a connection portion connecting the cylindrical intermediate wall portion to a center portion of the inner circumferential wall portion in the up-and-down direction;

an abutment portion having an outside portion connected to a lower end of the outer circumferential wall portion, and an inside portion connecting the outside portion to a lower end of the cylindrical intermediate wall portion; and ribs respectively formed along a radial direction of the face plate at portions of the face plate which becomes an inside of the engagement claws, wherein the abutment portion is arranged so that when an upward force is applied to the face plate from below and the face plate moves upward, the outside portion of the abutment portion is bent and is folded inward, and the inside portion of the abutment portion abuts against an inside face of a portion of the outer circumferential wall portion formed with the engagement claw, and the engagement claws are formed at predetermined intervals along a circumferential direction of the outer wall face of the outer circumferential wall portion.

2. The hole plug according to claim 1, further comprising a convex portion formed in a ring shape at a center portion of the face plate, and connected to the ribs.

3. A hole plug , comprising:

an annular flange portion for covering a hole edge circumferential face of an attachment hole of an attachment member;

a cylindrical outer circumferential wall portion extending downward from an inner circumferential edge portion of the annular flange portion;

engagement claws formed to protrude on an outer wall face of the outer circumferential wall portion, for engaging with the attachment hole;

a cylindrical intermediate wall portion extended in an up-and-down direction inside the outer circumferential wall portion with an interval therebetween;

a cylindrical inner circumferential wall portion extended in the up-and-down direction inside the cylindrical intermediate wall portion with an interval therebetween;

a face plate closing an upper-end inside the inner circumferential wall portion;

a connection portion connecting the cylindrical intermediate wall portion to a center portion of the inner circumferential wall portion in the up-and-down direction; and an abutment portion having an outside portion connected to a lower end of the outer circumferential wall portion, and an inside portion connecting the outside portion to a lower end of the cylindrical intermediate wall portion, wherein the abutment portion is arranged so that when an upward force is applied to the face plate from below and the face plate moves upward, the outside portion of the abutment portion is bent and is folded inward, and the inside portion of the abutment portion abuts against an inside face of a portion of the outer circumferential wall portion formed with the engagement claw, and the outside portion of the abutment portion has a thickness less than that of the inside portion of the abutment portion so that the outside portion of the abutment portion is bent and is folded inward, and the inside portion of the abutment portion abuts against the outer circumferential wall portion to prevent the engagement claws from deforming inward.

4. The hole plug according to claim 3, wherein the cylindrical intermediate wall portion has a thickness greater than that of the outside portion of the abutment portion and less than that of the inner circumferential wall portion.

5. The hole plug according to claim 4, wherein the thickness of cylindrical intermediate wall portion is substantially equal to the inside portion of the abutment portion.

6. The hole plug according to claim 5, wherein the thickness of the inner circumferential wall portion gradually reduces in a downward direction so that the interval between the inner circumferential wall portion and cylindrical intermediate wall portion gradually increases along the downward direction.

7. The hole plug according to claim 6, wherein the cylindrical intermediate wall portion has a height less than that of the outer circumferential wall portion.

* * * * *